(12) United States Patent
Boardman et al.

(10) Patent No.: US 10,465,909 B2
(45) Date of Patent: Nov. 5, 2019

(54) MINI MIXING FUEL NOZZLE ASSEMBLY WITH MIXING SLEEVE

(71) Applicant: General Electric Company, Schenectady, NY (US)

(72) Inventors: Gregory Allen Boardman, Liberty Township, OH (US); Bassam Sabry Mohammad Abdelnabi, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/343,814

(22) Filed: Nov. 4, 2016

(65) Prior Publication Data
US 2018/0128492 A1 May 10, 2018

(51) Int. Cl.
*F23R 3/28* (2006.01)
*F23R 3/34* (2006.01)
*F23R 3/14* (2006.01)

(52) U.S. Cl.
CPC .............. *F23R 3/286* (2013.01); *F23R 3/14* (2013.01); *F23R 3/34* (2013.01); *F23R 3/343* (2013.01); *F23R 3/346* (2013.01); *F23R 2900/03343* (2013.01); *Y02T 50/675* (2013.01)

(58) Field of Classification Search
None
See application file for complete search history.

(56) References Cited

U.S. PATENT DOCUMENTS

| 3,917,173 | A | 11/1975 | Singh |
| 4,100,733 | A | 7/1978 | Striebel et al. |
| 4,177,637 | A | 12/1979 | Pask |
| 4,408,461 | A | 10/1983 | Bruhwiler et al. |
| 4,412,414 | A | 11/1983 | Novick et al. |
| 4,689,961 | A | 9/1987 | Stratton |
| 4,967,561 | A | 11/1990 | Bruhwiler et al. |
| 5,207,064 | A | 5/1993 | Ciokajlo et al. |
| 5,211,675 | A | 5/1993 | Bardey et al. |
| 5,265,409 | A | 11/1993 | Smith, Jr. et al. |

(Continued)

OTHER PUBLICATIONS

Yunus Cengel, Thermodynamics: An Engineering Approach, 2004, McGraw Hill, Fifth edition, pp. 832-834 (Year: 2004).*

(Continued)

*Primary Examiner* — Craig Kim
*Assistant Examiner* — Stephanie Cheng
(74) *Attorney, Agent, or Firm* — Dority & Manning, P.A.

(57) ABSTRACT

The present disclosure is directed to a fuel nozzle for a gas turbine engine. The fuel nozzle includes a sleeve defining a plurality of radially oriented air inlet ports. The sleeve defines a sleeve outlet at the downstream end of the fuel nozzle and a longitudinally extended annular inner wall inward of the sleeve in the radial direction. The inner wall defines a fluid passage and an inner wall outlet, in which the inner wall outlet is disposed toward the downstream end of the inner wall. At least a portion of the plurality of radially oriented air inlet ports is outward of the inner wall along the radial direction. The fuel nozzle further includes a plurality of fuel injectors surrounding the sleeve, in which the sleeve and each of the fuel injectors are connected to an aft body at the downstream end and a forward body at the upstream end.

13 Claims, 11 Drawing Sheets

(56) References Cited

U.S. PATENT DOCUMENTS

| | | |
|---|---|---|
| 5,307,634 A | 5/1994 | Hu |
| 5,511,375 A | 4/1996 | Joshi et al. |
| 5,592,821 A | 1/1997 | Alary et al. |
| 5,619,855 A | 4/1997 | Burros |
| 5,622,054 A | 4/1997 | Tingle |
| 5,829,967 A | 11/1998 | Chyou |
| 5,839,283 A | 11/1998 | Dobbeling |
| 5,937,653 A | 8/1999 | Alary et al. |
| 6,038,861 A | 3/2000 | Amos et al. |
| 6,286,298 B1 | 9/2001 | Burrus et al. |
| 6,295,801 B1 | 10/2001 | Burrus et al. |
| 6,331,109 B1 | 12/2001 | Paikert et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,724 B2 | 4/2003 | Cornwell et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,772,594 B2 | 8/2004 | Nishida et al. |
| 6,837,050 B2 | 1/2005 | Mandai et al. |
| 6,837,051 B2 | 1/2005 | Mandai et al. |
| 6,915,637 B2 | 7/2005 | Nishida et al. |
| 6,962,055 B2 | 11/2005 | Chen et al. |
| 7,036,482 B2 | 5/2006 | Beck et al. |
| 7,188,476 B2 | 3/2007 | Inoue et al. |
| 7,200,998 B2 | 4/2007 | Inoue et al. |
| 7,313,919 B2 | 1/2008 | Inoue et al. |
| 7,360,363 B2 | 4/2008 | Mandai et al. |
| 7,565,803 B2 | 7/2009 | Li et al. |
| 7,677,026 B2 | 3/2010 | Conete et al. |
| 7,770,397 B2 | 8/2010 | Patel et al. |
| 7,788,929 B2 | 9/2010 | Biebel et al. |
| 7,810,333 B2 | 10/2010 | Kraemer et al. |
| 7,966,801 B2 | 6/2011 | Umeh et al. |
| 8,161,751 B2 | 4/2012 | Hall |
| 8,276,385 B2 | 10/2012 | Zuo et al. |
| 8,316,644 B2 | 11/2012 | Wilbraham |
| 8,322,143 B2 | 12/2012 | Uhm et al. |
| 8,424,311 B2 | 4/2013 | York et al. |
| 8,438,852 B2 * | 5/2013 | Valeev ............... F23R 3/34 60/739 |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,590,311 B2 | 11/2013 | Parsania et al. |
| 8,621,870 B2 | 1/2014 | Carroni et al. |
| 8,671,691 B2 | 3/2014 | Boardman et al. |
| 8,701,417 B2 | 4/2014 | Nicholls et al. |
| 8,863,524 B2 | 10/2014 | Karlsson et al. |
| 8,938,971 B2 | 1/2015 | Poyyapakkam et al. |
| 8,943,835 B2 | 2/2015 | Corsmeier et al. |
| 9,091,444 B2 | 7/2015 | Turrini et al. |
| 9,335,050 B2 | 5/2016 | Cunha et al. |
| 9,366,437 B2 * | 6/2016 | Melton ............... F23R 3/286 |
| 9,377,192 B2 | 6/2016 | Hirata et al. |
| 9,388,985 B2 | 7/2016 | Wu et al. |
| 9,416,973 B2 | 8/2016 | Melton et al. |
| 9,423,137 B2 | 8/2016 | Nickolaus |
| 2003/0101729 A1 | 6/2003 | Srinivasan |
| 2011/0016866 A1 * | 1/2011 | Boardman ............... F23R 3/28 60/730 |
| 2011/0016871 A1 | 1/2011 | Kraemer et al. |
| 2011/0083439 A1 | 4/2011 | Zuo et al. |
| 2011/0252803 A1 | 10/2011 | Subramanian et al. |
| 2011/0265482 A1 * | 11/2011 | Parsania ............... F23R 3/286 60/740 |
| 2012/0096866 A1 | 4/2012 | Khan et al. |
| 2012/0131923 A1 | 5/2012 | ElKady et al. |
| 2012/0285173 A1 | 11/2012 | Poyyapakkam et al. |
| 2013/0042625 A1 | 2/2013 | Barker et al. |
| 2013/0199188 A1 | 8/2013 | Boardman et al. |
| 2013/0239581 A1 | 9/2013 | Johnson et al. |
| 2013/0336759 A1 | 12/2013 | Christians |
| 2014/0060060 A1 | 3/2014 | Bernero et al. |
| 2014/0096502 A1 * | 4/2014 | Karlsson ............... F23K 5/12 60/39.59 |
| 2014/0290258 A1 | 10/2014 | Gerendas et al. |
| 2015/0076251 A1 | 3/2015 | Berry |
| 2015/0128607 A1 | 5/2015 | Lee |
| 2015/0159875 A1 | 6/2015 | Berry et al. |
| 2016/0010856 A1 | 1/2016 | Biagioli et al. |
| 2016/0169110 A1 | 6/2016 | Myers et al. |
| 2016/0209036 A1 * | 7/2016 | Cheung ............... F23R 3/14 |

OTHER PUBLICATIONS

Srinivasan et al., "Improving low load combustion, stability, and emissions in pilot-ignited natural gas engines", Journal of Automobile Engineering, Sage journals, vol. 220, No. 2, pp. 229-239, Feb. 1, 2006.

Snyder et al., "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, pp. 38-45, Jan. 1, 1996.

* cited by examiner

MINI MIXING FUEL NOZZLE ASSEMBLY WITH MIXING SLEEVE

FIELD

The present subject matter relates generally to gas turbine engine combustion assemblies. More particularly, the present subject matter relates to a premixing fuel nozzle assembly for gas turbine engine combustors.

BACKGROUND

Aircraft and industrial gas turbine engines include a combustor in which fuel is burned to input energy to the engine cycle. Typical combustors incorporate one or more fuel nozzles whose function is to introduce liquid or gaseous fuel into an air flow stream so that it can atomize and burn. General gas turbine engine combustion design criteria include optimizing the mixture and combustion of a fuel and air to produce high-energy combustion while minimizing emissions such as carbon monoxide, carbon dioxide, nitrous oxides, and unburned hydrocarbons, as well as minimizing combustion tones due, in part, to pressure oscillations during combustion. Additionally, general gas turbine engine combustion design must produce gas turbine engine operability at full power condition as well as part power conditions without producing undesirable emissions outputs or pressure oscillations.

Therefore, a need exists for a fuel nozzle or combustion assembly that may produce high-energy combustion while minimizing emissions and combustion instability at full power and part power conditions.

BRIEF DESCRIPTION

Aspects and advantages of the invention will be set forth in part in the following description, or may be obvious from the description, or may be learned through practice of the invention.

The present disclosure is directed to a fuel nozzle for a gas turbine engine. The fuel nozzle defines a radial direction, a longitudinal direction, an upstream end, and a downstream end. The fuel nozzle includes a sleeve defining a plurality of radially oriented air inlet ports. The sleeve defines a sleeve outlet at the downstream end of the fuel nozzle. The sleeve further includes an annular inner wall inward of the sleeve in the radial direction, in which the inner wall is extended in the longitudinal direction. The inner wall defines a fluid passage and an inner wall outlet, in which the inner wall outlet is disposed toward the downstream end of the inner wall. At least a portion of the plurality of radially oriented air inlet ports is outward of the inner wall along the radial direction. The fuel nozzle further includes a plurality of fuel injectors surrounding the sleeve, in which the sleeve and each of the fuel injectors are connected to an aft body at the downstream end and a forward body at the upstream end.

A further aspect of the present disclosure is directed to a combustor assembly for a gas turbine engine, in which the combustor assembly defines a radial direction, a longitudinal direction, an upstream end, and a downstream end. The combustor assembly includes a bulkhead wall extended radially between an upstream end of an inner liner and an outer liner, in which the inner liner is radially spaced from the outer liner with respect to an engine centerline and defines an annular combustion chamber therebetween. The inner liner and the outer liner extend downstream from the bulkhead wall. The combustor assembly further includes one or more fuel nozzles extended at least partially through the bulkhead wall.

A still further aspect of the present disclosure is directed to a method of operating a gas turbine engine at full power or part power condition. The gas turbine engine includes a combustor assembly defining a first combustion zone, a second combustion zone, and a third combustion zone, in which the method includes sending a first quantity of fuel and a first compressed air through a fuel nozzle; sending a second quantity of fuel and a second compressed air through the fuel nozzle; and sending a third quantity of fuel and a third compressed air through a fuel nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
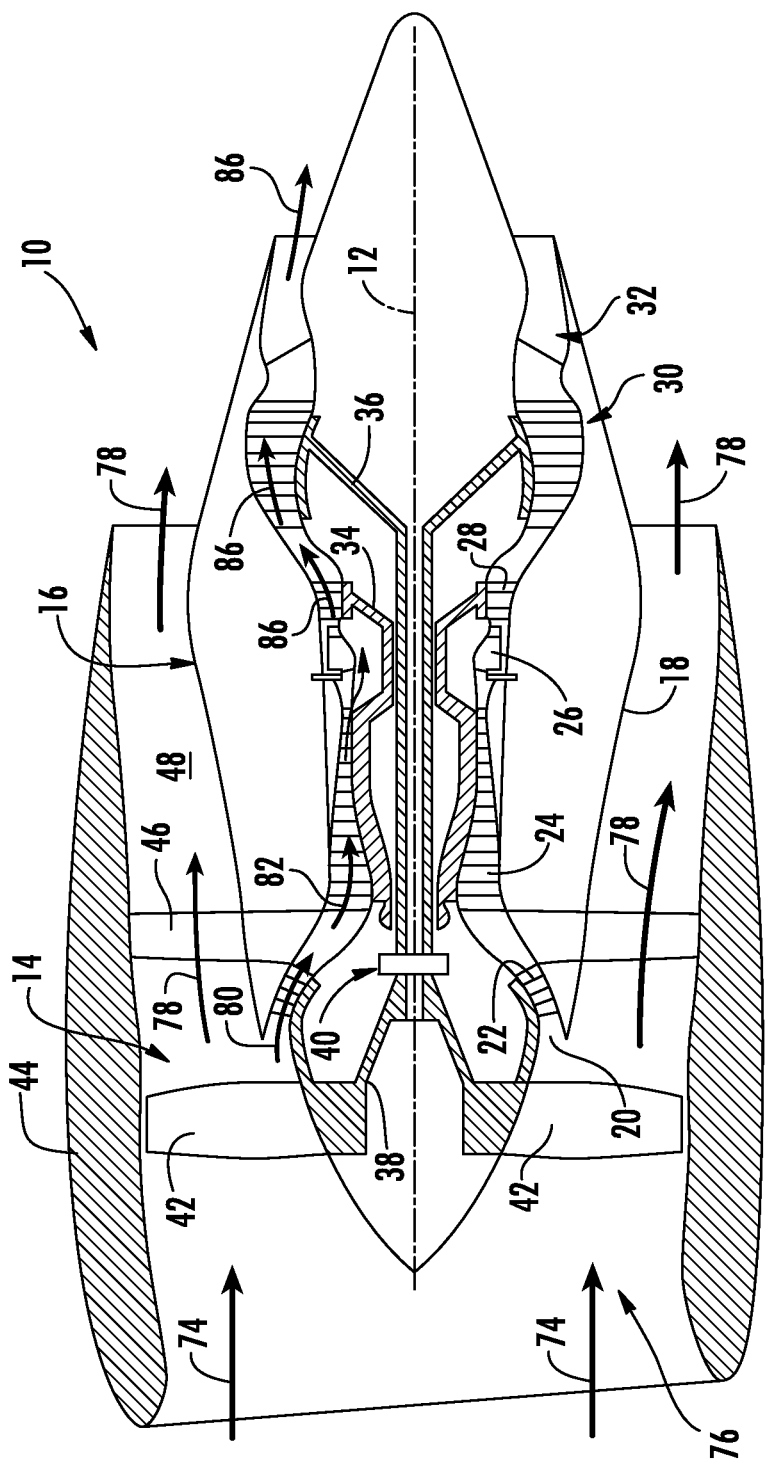
FIG. 1 is a schematic cross sectional view of an exemplary gas turbine engine incorporating an exemplary embodiment of a fuel nozzle and combustor assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A mini mixing fuel nozzle with mixing sleeve and combustor assembly are generally provided that may produce high-energy combustion while minimizing emissions and increasing combustion stability at full power and/or part power conditions in a gas turbine engine. Additionally, the mini mixing fuel nozzle with mixing sleeve and combustor assembly may enhance flame stability at full power and/or part power conditions and improve ignition. In one embodiment, the combination of a plurality of mini mixing fuel injectors surrounding one or more fuel-air mixing sleeves may improve ignition, emissions, and combustion stability at ignition or light-off, ramp-up to full power (e.g. maximum take off condition, full load, etc.), and turndown (e.g. from full power to part power condition or shutdown). In another embodiment, the mixing sleeve may include a pressure atomizer to improve fuel atomization and combustion performance.

In particular embodiments, the combustor assembly including a plurality of mini mixing fuel nozzles with fuel-air mixing sleeves may provide finer combustion dynamics and emissions controllability and/or increase overall gas turbine engine operability. Combustion dynamics controllability may include reducing differences in combustion temperature around a circumference of a combustion chamber, controlling emissions at part power and full power condition, increasing gas turbine engine operability at part power and full power conditions, and avoiding lean blowout (LBO).

The mixing sleeve defines a separately controllable fuel-air mixing passage from one or more fuel injectors of each fuel nozzle. In various embodiments, the mixing sleeve may define a pilot fuel-air nozzle or provide a main fuel-air supply. Additionally, or alternatively, the mixing sleeve defines a fuel and air flowpath independent of the one or more fuel injectors.

Referring now to the drawings, FIG. 1 is a schematic partially cross-sectioned side view of an exemplary high by-pass turbofan jet engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
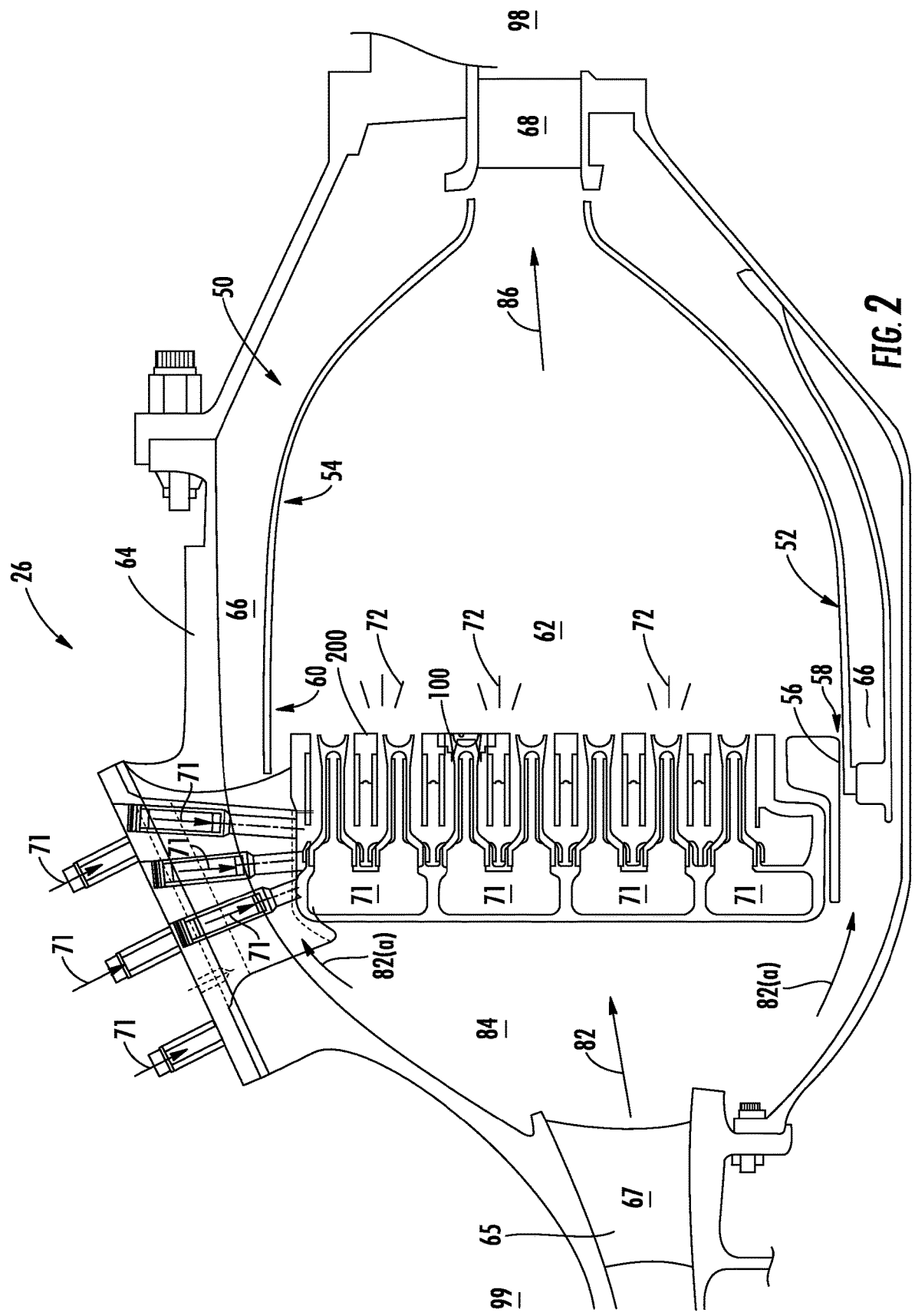
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor 50 having an annular inner liner 52, an annular outer liner 54 and a bulkhead wall 56 that extends radially between upstream ends 58, 60 of the inner liner 52 and the outer liner 54 respectfully. In other embodiments of the combustion section 26, the combustion assembly 50 may be a can or can-annular type. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within an outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28. A fuel nozzle 200 may extend at least partially through the bulkhead wall 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel nozzle 200. The compressed air 82 pressurizes the diffuser cavity 84. The compressed air 82 enters the fuel nozzle 200 and into a plurality of fuel injectors 100 within the fuel nozzle 200 to mix with a fuel 71. The fuel 71 may be a gaseous or liquid fuel, including, but not limited to, fuel oils, jet fuels propane, ethane, hydrogen, coke oven gas, natural gas, synthesis gas, or combinations thereof. The fuel injectors 100 premix fuel 71 and air 82 within the array of fuel injectors with little or no swirl to the resulting fuel-air mixture 72 exiting the fuel nozzle 200. After premixing the fuel 71 and air 82 within the fuel injectors 100, the fuel-air mixture 72 burns from each of the plurality of fuel injectors 100 as an array of compact, tubular flames stabilized from each fuel injector 100.

Typically, the LP and HP compressors 22, 24 provide more compressed air to the diffuser cavity 84 than is needed for combustion. Therefore, a second portion of the compressed air 82 as indicated schematically by arrows 82($a$) may be used for various purposes other than combustion. For example, as shown in FIG. 2, compressed air 82($a$) may be routed into the outer flow passage 66 to provide cooling to the inner and outer liners 52, 54. In addition or in the alternative, at least a portion of compressed air 82($a$) may be routed out of the diffuser cavity 84. For example, a portion of compressed air 82($a$) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 3:
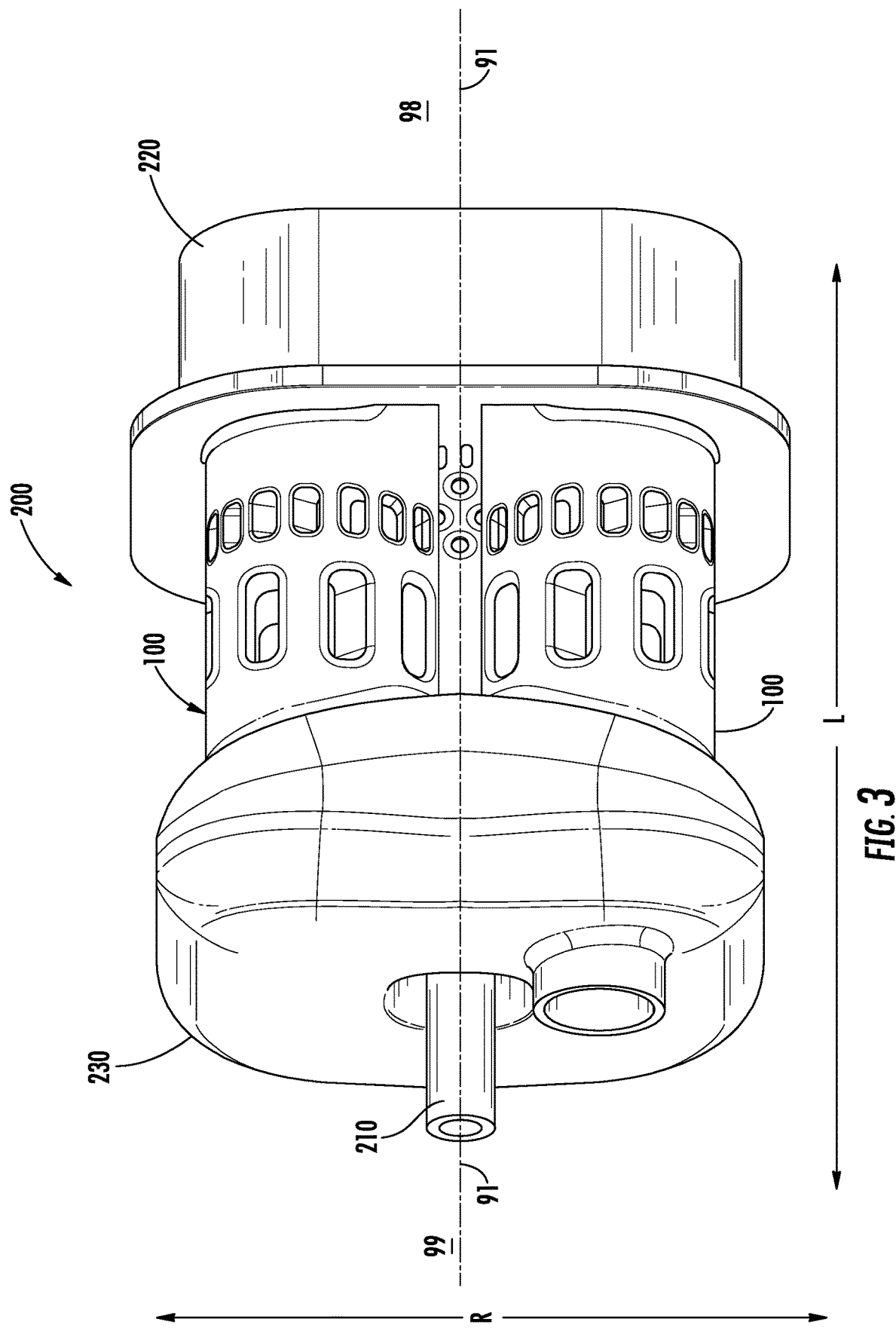
FIG. 3 is a perspective view of an exemplary embodiment of a fuel nozzle of the combustor assembly shown in FIG. 2.
Figure 4:
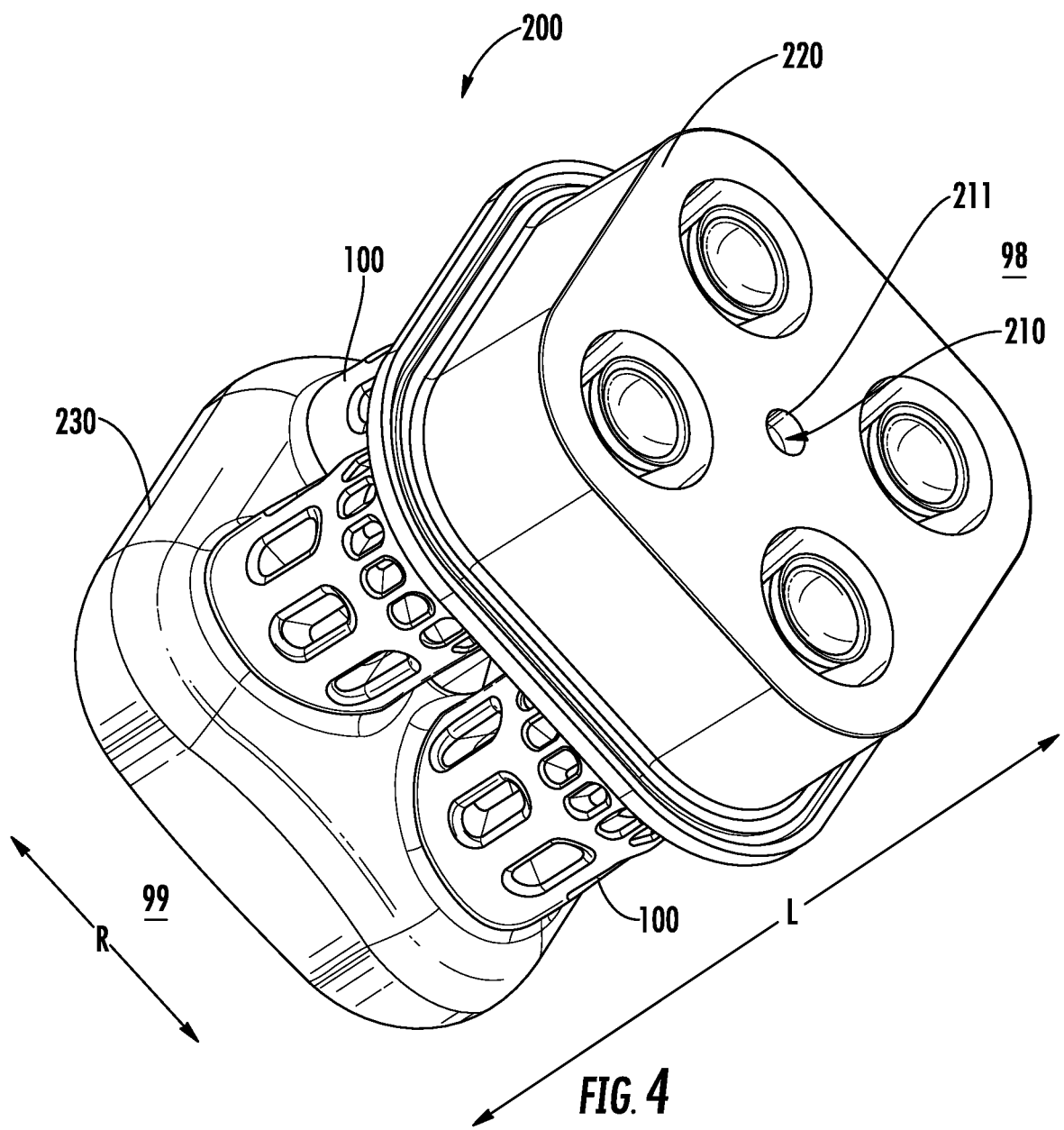
FIG. 4 is another perspective view an exemplary embodiment of a fuel nozzle of the combustor assembly shown in FIG. 2.

Referring now to FIGS. 3 and 4, perspective views of a portion of an exemplary embodiment of a mini mixing fuel nozzle 200 (herein referred to as "fuel nozzle 200") of the combustor assembly 50 are provided. The fuel nozzle 200 defines a longitudinal direction L, a radial direction R, and longitudinal fuel nozzle centerline 91. The fuel nozzle 200 includes a fuel-air mixing sleeve 210 (referred to herein as "sleeve 210") extended in the longitudinal direction L and a plurality of fuel injectors 100 surrounding the sleeve 210. The sleeve 210 and each of the fuel injectors 100 are connected to an aft body 220 of the fuel nozzle 200 at a downstream end 98. The sleeve 210 and each of the fuel injectors 100 are connected to a forward body 230 at an upstream end 99 of the fuel nozzle 200. The sleeve 210 defines a sleeve outlet 211 at the downstream end 98 of the fuel nozzle 200. In the embodiment shown in FIG. 4, the sleeve 210 defines the sleeve outlet 211 through the aft body 220.

Figure 5:
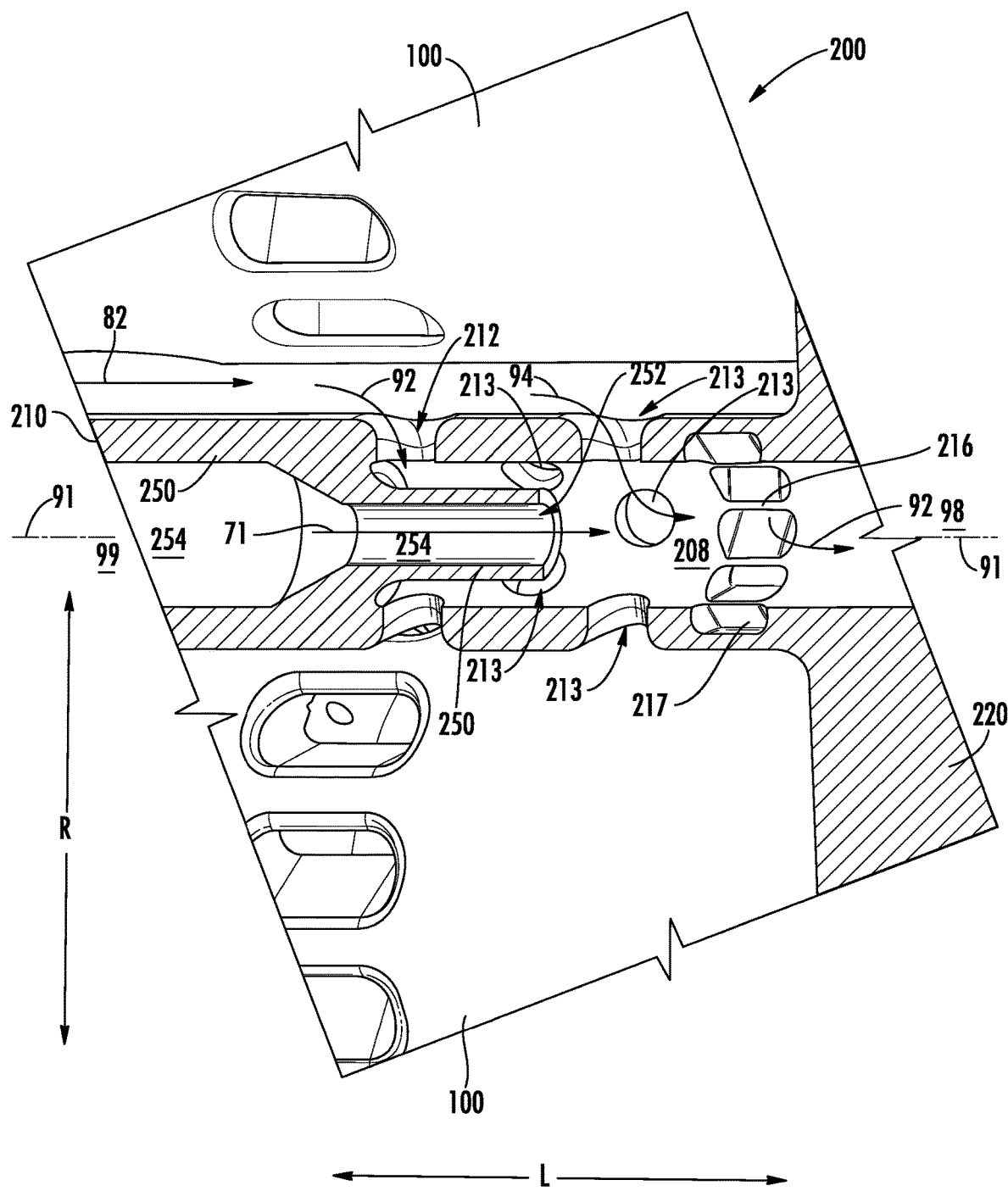
FIG. 5 is a perspective view of a portion of the exemplary embodiment of the fuel nozzle shown in FIG. 3.

Referring now to FIG. 5, a perspective view of a portion of the fuel nozzle 200 is shown. Referring to FIGS. 3 and 4 in addition to FIG. 5, the sleeve 210 defines a plurality of radially oriented first air inlet ports 212. The sleeve 210 includes an annular inner wall 250 inward of the sleeve 210 in radial direction R and extended in longitudinal direction L toward the downstream end 98. The inner wall 250 defines an inner wall outlet 252 disposed toward the downstream end 98 of the inner wall 250. The inner wall 250 further defines a fluid passage 254 therewithin in the radial direction R. At least a portion of the plurality of radially oriented first air inlet ports 212 is disposed radially outward of the inner wall 250.

In one embodiment, the sleeve 210 defines the fluid passage 254 upstream of the inner wall 250. In another embodiment, at least a portion of the inner wall 250 is an inner diameter portion of the sleeve 210 upstream of the first air inlet ports 212.

In one embodiment, the sleeve 210 defines a plurality of second radially oriented air inlet ports 213 disposed radially outward of the inner wall outlet 252. In another embodiment, the plurality of radially oriented second air inlet ports 213 is disposed downstream and proximate of the inner wall outlet 252. For example, the plurality of radially oriented second air inlet ports 213 may be within five inner wall outlet diameter lengths of the inner wall outlet 252 along the longitudinal direction L. As another non-limiting example, the plurality of radially oriented second air inlet ports 213 may be within three inner wall outlet diameter length of the inner wall outlet 252 along the longitudinal direction L.

The sleeve 210 may define a mixing passage 208 extended from the inner wall outlet 252 to the sleeve outlet 211 (shown in FIG. 4). In one embodiment, the compressed air 82, as a first stream of air 92, enters the mixing passage 208 through the radially oriented first air inlet ports 212. The first stream of air 92 flows toward the downstream end 98. The fuel 71 flows through the fluid passage 254 toward the downstream end 98. The fuel 71 exits through the inner wall outlet 252 and mixes with the first stream of air 92 in the mixing passage 208. The mixture of fuel 71 and air 82 flows toward the downstream end 98 of the fuel nozzle 200 and enters the combustion chamber 62 through the sleeve outlet 211.

In another embodiment of the sleeve 210, compressed air 82, as a second stream of air 94, enters the mixing passage 208 through the radially oriented second air inlet ports 213 and mixes with the fuel 71 exiting the fluid passage 254. In yet another embodiment of the fuel nozzle 200, the sleeve 210 may include a plurality of air inlet port walls 216 defining a radial swirler 217. In various embodiments, the first and/or second air inlet ports 212, 213 may include the air inlet port walls 216 to define radial swirlers 217 at the first and/or second air inlet ports 212, 213.

Figure 9:
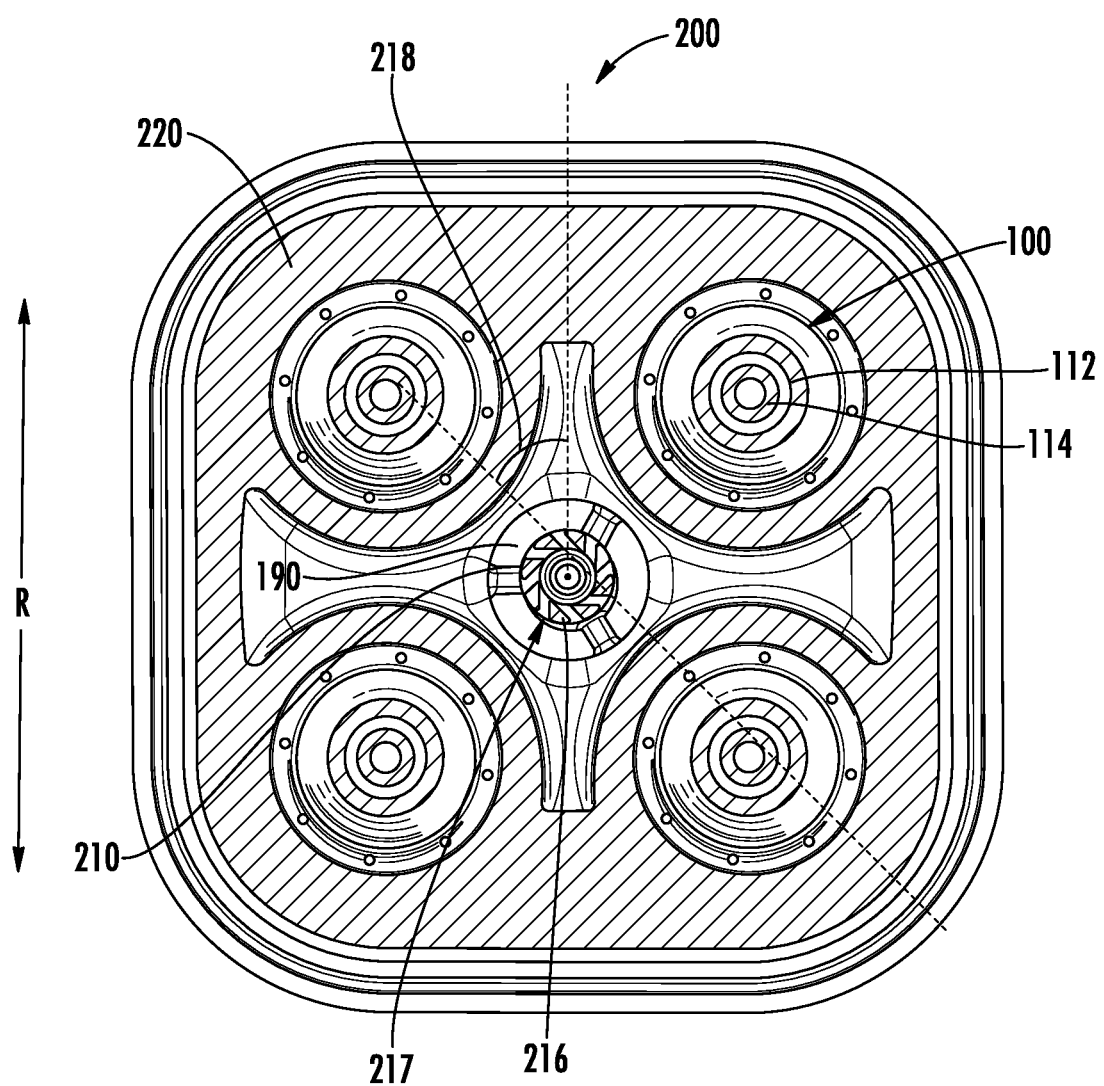
FIG. 9 is a cross sectional view of an exemplary embodiment of the fuel nozzle shown in FIG. 8 at plane 9-9.

In various embodiments, the sleeve 210 may define the first and/or second air inlet ports 212, 213 as a straight flow (i.e. without air inlet port walls 216) in combination with the radial swirler 217. In other embodiments, the sleeve 210 may include air inlet port walls 216 at the first and/or second air inlet ports 212, 213 to define a swirling flow. In one embodiment, the first and second air inlet ports 212, 213 may be arranged in co-swirling arrangement (i.e. the air inlet port walls 216 at the first and second air inlet ports 212, 213 are each positive or negative angles relative to the longitudinal fuel nozzle centerline 91, as shown in FIG. 9). In another embodiment, the first and second air inlet ports 212, 213 may be arranged in counter-swirling arrangement (i.e. the air inlet port walls 216 at the first air inlet ports 212 are a positive angle and the second air inlet ports 213 are a negative angle relative to the longitudinal fuel nozzle centerline 91).

Figure 6:
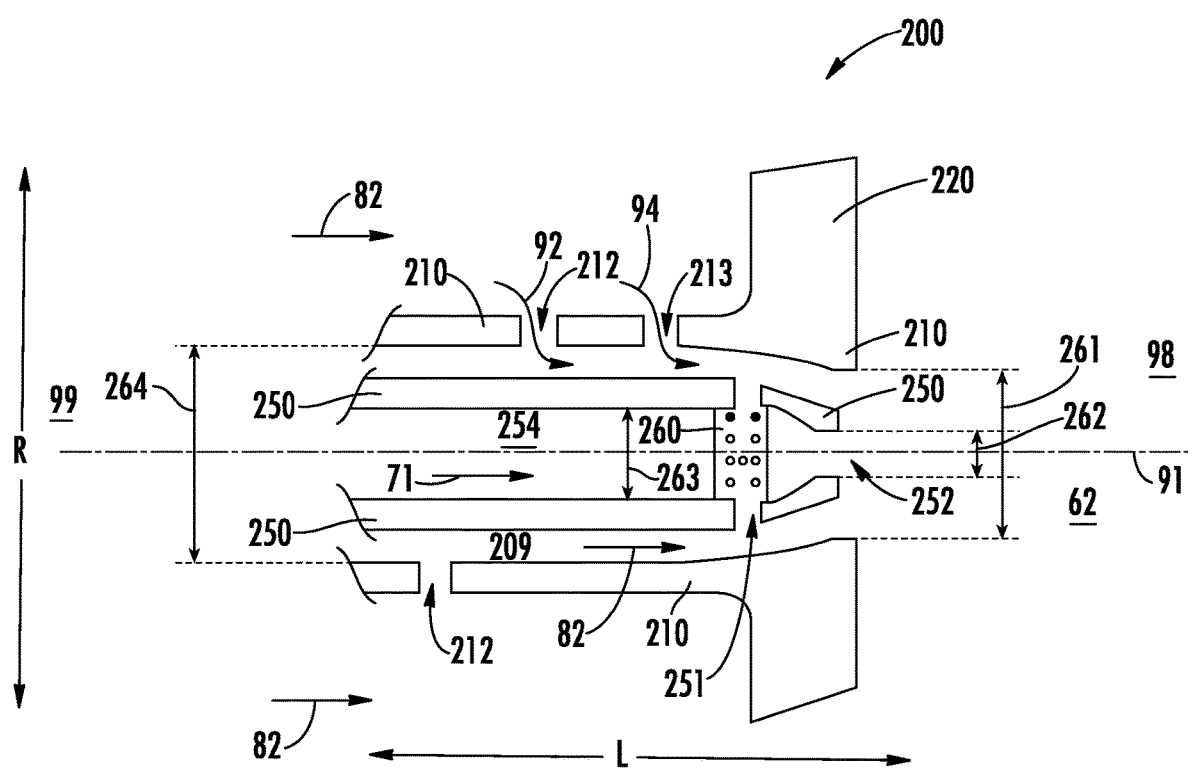
FIG. 6 is an axial cross sectional view of an exemplary embodiment of the fuel nozzle.

Referring now to FIG. 6, an exemplary embodiment of a fuel nozzle 200 is shown in which the inner wall 250 extends in the longitudinal direction L to the sleeve outlet 211 at the downstream end 98 of the fuel nozzle 200. The inner wall 250 and the sleeve 210 define an air passage 209 radially therebetween. The compressed air 82 (e.g. the first and/or second streams of air 92, 94) may flow through the air passage 209. In the embodiment shown in FIG. 5, the fluid passage 254 extends within the inner wall 250 to the downstream end 98 of the sleeve 210. The fuel 71 in the fluid passage 254 and the air 82 in the air passage 209 may exit into and mix in the combustion chamber 62.

In the embodiment shown in FIG. 6, the inner wall 250 may further include a pressure atomizer 260 disposed radially within the inner wall 250 in the fluid passage 254. The pressure atomizer 260 may be disposed toward the downstream end 98 of the fuel nozzle 200. For example, the pressure atomizer 260 may be proximate to the combustion chamber 62. In one embodiment, the pressure atomizer 260 is within approximately three sleeve outlet diameters 261 of the sleeve outlet 211. In another embodiment, the pressure atomizer 260 is within approximately one sleeve outlet diameter 261 of the sleeve outlet 211. In various embodiments, the pressure atomizer 260 is a single orifice pressure swirl, a dual orifice pressure swirl, an air assist, an ultrasonic, electrostatic, or an effervescent pressure atomizer. In other embodiments, the fuel nozzle 200 includes a plurality of sleeves 210 including inner walls 250 defining different pressure atomizers 260, in which the fuel nozzle 200 includes a combination of the aforementioned pressure atomizers 260. In still other embodiments, the inner wall 250 may define one or more inner wall air inlet ports 251 to provide a stream of air 82 to the pressure atomizer 260.

Referring back to FIG. 6, in one embodiment, at least a portion of the inner wall 250 converges toward the longitudinal fuel nozzle centerline 91 of the sleeve 210 as the inner wall 250 extends toward the downstream end 98 of the fuel nozzle 200. In one embodiment, the inner wall outlet 252 defines an inner wall outlet diameter 262 that is greater than 0% to about 50% of an inner wall diameter 263 of the inner wall 250. In another embodiment, the inner wall outlet 252 defines the inner wall outlet diameter 262 at greater than 0% to about 33% of the inner wall diameter 263. In still another embodiment, the inner wall outlet 252 defines the inner wall outlet diameter 262 at greater than 0% to about 25% of the inner wall diameter 263. In another embodiment of the sleeve 210 shown in FIG. 6, at least a portion of the sleeve 210 converges toward the longitudinal fuel nozzle centerline 91 as the inner wall 250 extends toward the downstream end 98 of the fuel nozzle 200. In one embodiment, the sleeve outlet 211 defines the sleeve outlet diameter 261 that is greater than 0% to about 50% of a sleeve diameter 264 of the sleeve 210. In another embodiment, the sleeve outlet 211 defines the sleeve outlet diameter 261 at greater than 0% to about 40% of the sleeve diameter 264. In still another embodiment, the sleeve outlet 211 defines the sleeve outlet diameter 261 at greater than 0% to about 30% of the sleeve diameter 264.

In still other embodiments, at least a portion of the sleeve 210 may diverge from the longitudinal fuel nozzle centerline 91 such that the sleeve outlet 211 defines the sleeve outlet diameter 261 greater than the sleeve diameter 264. In still yet other embodiments, at least a portion of the inner wall 250 may diverge from the longitudinal fuel nozzle centerline 91 such that the inner wall outlet 251 defines the inner wall outlet diameter 262 greater than the inner wall diameter 263.

Figure 7:
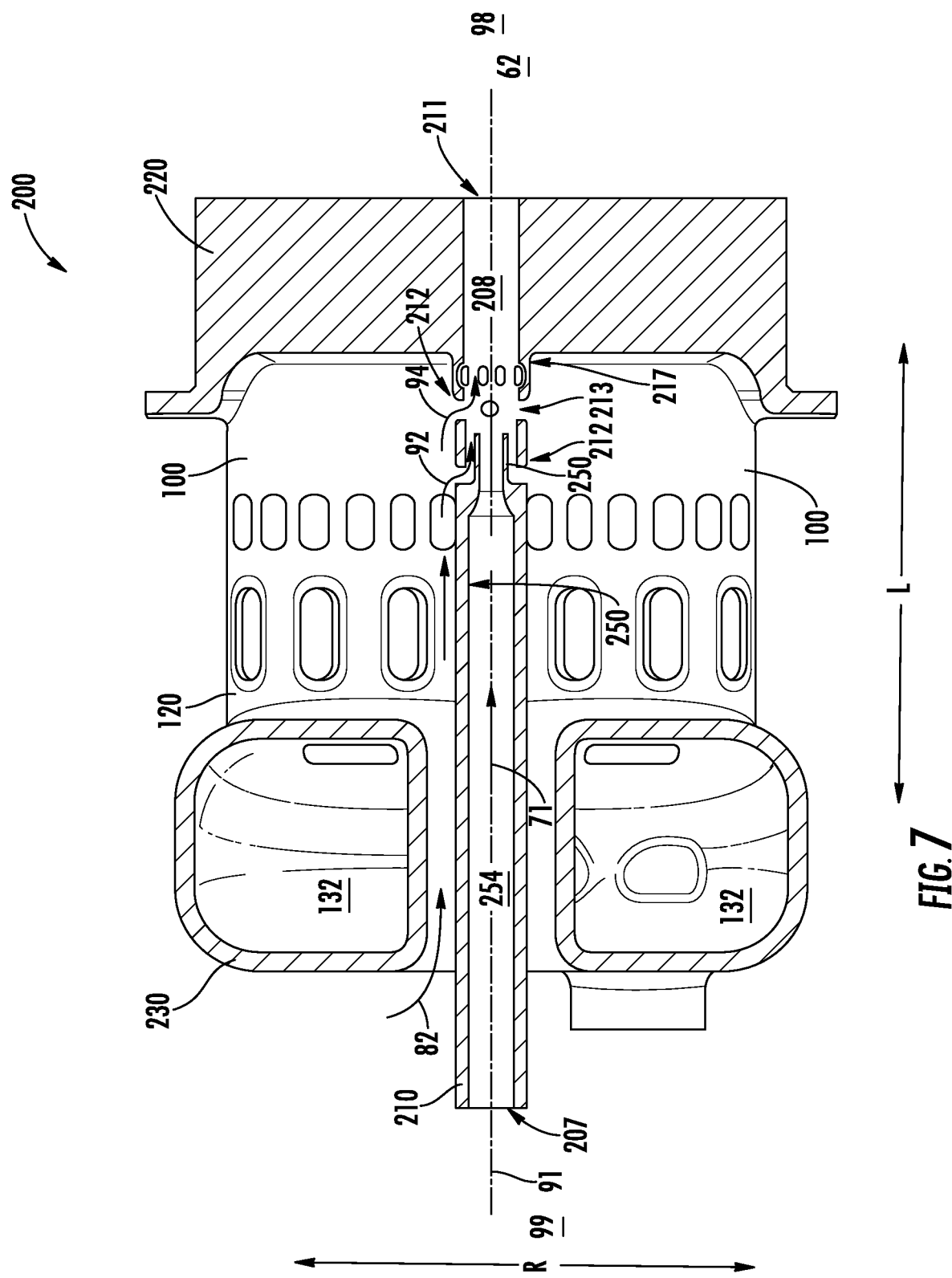
FIG. 7 is an axial cross sectional view of an exemplary embodiment of the fuel nozzle shown in FIG. 4.
Figure 8:
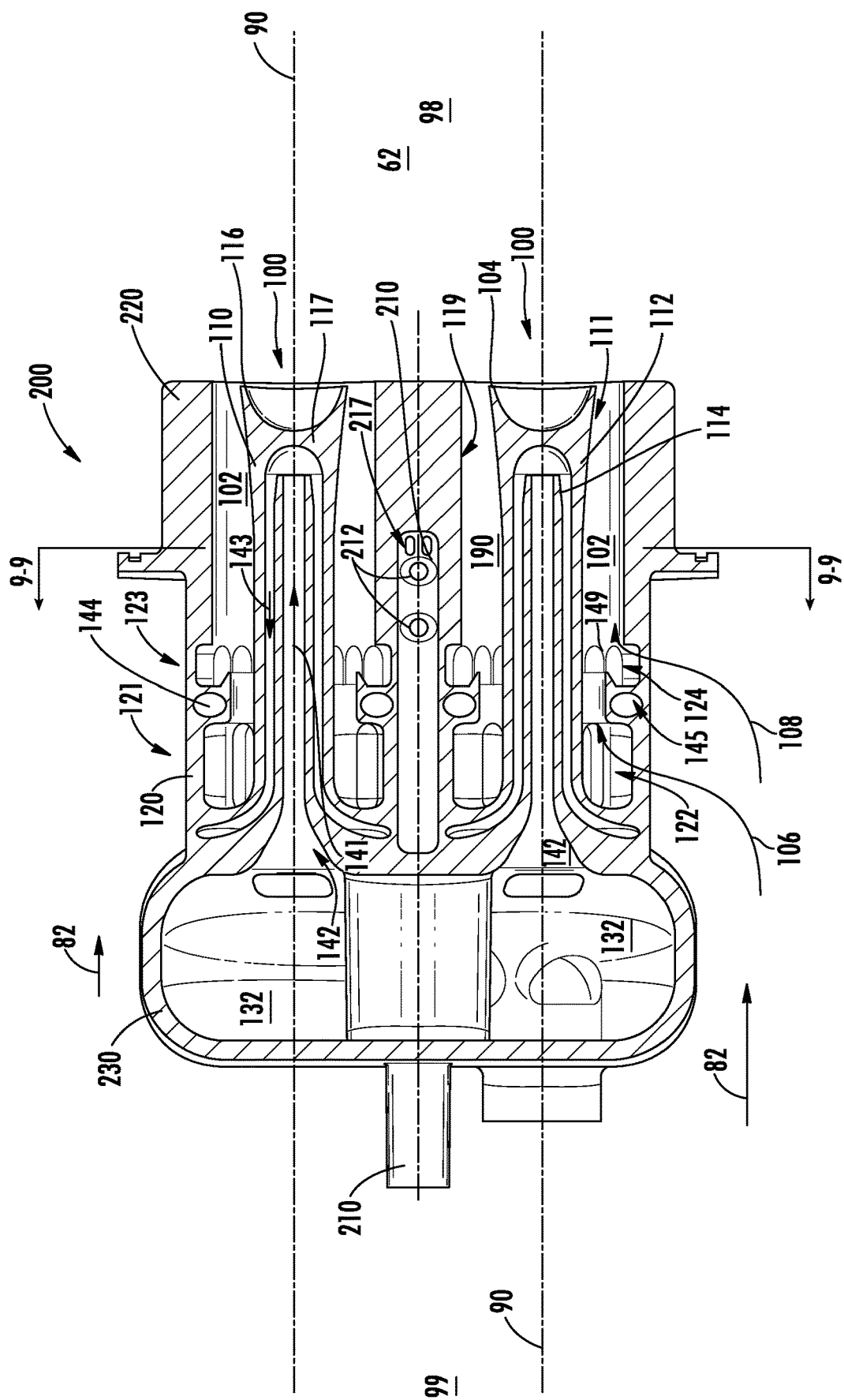
FIG. 8 is another axial cross sectional view of an exemplary embodiment of the fuel nozzle shown in FIG. 4.

Referring now to FIGS. 7-9, cutaway cross sectional views of exemplary embodiments of the fuel nozzle 200 showing exemplary relationships between the sleeve 210 and the fuel injectors 100 are provided. In the axial cross sectional view of the exemplary embodiment of the fuel nozzle 200 shown in FIG. 7, the sleeve 210 extends from the upstream end 99 to the downstream end 98. The sleeve 210 is disposed radially between a plurality of fuel injectors 100. The sleeve 210 is connected at the upstream end 98 to the forward body 230 of the fuel nozzle 200. The sleeve 210 is connected at the downstream end 98 to the aft body 220 of the fuel nozzle 200. At least a portion of the sleeve 210 may be a unitary structure with the forward and/or aft body 230, 220 of the fuel nozzle 200. In one embodiment, the pressure atomizer 260 (shown in FIG. 6) may be disposed in the sleeve 210 or outer wall 250 inward of the aft body 230 in the radial direction R.

Referring still to FIG. 7, the sleeve 210 may define a sleeve inlet 207 toward the upstream end 99 of the sleeve 210. The sleeve inlet 207 may allow the fuel 71 to enter the fluid passage 254. The fluid passage 254 and the sleeve inlet 207 may be connected to a tube, pipe, manifold, or other walled structure delivering the fuel 71 from a fuel source. In other embodiments, the fluid passage 254 may additionally be connected an air or inert gas source. For example, the air or inert gas source may flow air or inert gas through the fluid passage 254 to purge, cool, or provide buffering for the sleeve 210, the fuel nozzle 200, or the combustor assembly 50.

Referring now to FIG. 8, an axial cross sectional side view of an exemplary embodiment of the fuel injectors 100 of the fuel nozzle 200 shown in FIGS. 1-6 is provided. The fuel injector 100 includes a centerbody 110, the outer sleeve 120, and the forward body 230. The centerbody 110 includes an axially extended outer wall 112 and an axially extended inner wall 114. The outer wall 112 and the inner wall 114 extend from the forward body 230 toward the downstream end 98 of the fuel nozzle 200. The outer wall 112, the inner wall 114, and the forward body 230 together define a fluid conduit 142. The fluid conduit 142 extends in a first direction 141 toward the downstream end 98 of the fuel injector 100 and in a second direction 143 toward the upstream end 99 of the fuel nozzle 200.

The outer sleeve 120 surrounds the centerbody 110 from the forward body 230 toward the downstream end 98 of the fuel injector 100. The outer sleeve 120 and the centerbody 110 together define a premix passage 102 therebetween and an outlet 104. The centerbody 110 may further define a centerbody surface 111 radially outward of the outer wall 112 and along the premix passage 102. The outer sleeve 120 may further define an outer sleeve surface 119 radially inward of the outer sleeve 120 and along the premix passage 102. The outlet 104 is defined at the downstream end 98 of the premix passage 102 of the fuel injector 100. The outer sleeve 120 defines a plurality of radially oriented first air inlet ports 122 in circumferential arrangement at a first axial portion 121 of the outer sleeve 120. The outer sleeve 120 further defines a plurality of radially oriented second air inlet ports 124 in circumferential arrangement at a second axial portion 123 of the outer sleeve 120.

The outer sleeve 120 defines a first fluid passage 144, arranged between each first air inlet port 122 and extended from the fluid conduit 142 and the forward body 230. The outer sleeve 120 also defines a first fluid injection port 145 in fluid communication with the first fluid passage 144. The fluid conduit 142, the first fluid passage 144, and the first fluid injection port 145 may flow the fuel 71, air, or an inert gas.

The outer sleeve further defines an annular lip 149 extended axially toward the downstream end 98 of the fuel injector 100. The lip 149 extends from the first fluid injection port 145 into the premix passage 102. In various embodiments, the lip 149 is disposed radially inward of the radially oriented second air inlet ports 124. The lip 149 may further extend from radially outward of each first fluid injection port 145 to radially inward of each fluid injection port 145. The lip 149 may define a plain jet flow of the fuel 71 from the first fluid injection port 145 into the premix passage 102 as the fuel 71 mixes with the first and second streams of air 106, 108. In various embodiments, the lip 149 may further define a prefilming flow of the fuel 71 as it mixes with the first and second streams of air 106, 108.

Referring still to the exemplary embodiment shown in FIG. 8, the first fluid injection port 145 is axially oriented and disposed radially inward of the second air inlet port 124. The serial combination of the radially oriented first air inlet port 122, the axially oriented first fluid injection port 145, and the radially oriented second air inlet port 124 radially outward of the first fluid injection port 145 may provide a compact, non-swirl or low-swirl premixed flame (i.e. shorter length flame) at a higher primary combustion zone temperature (i.e. higher energy output), while meeting or exceeding present emissions standards. As fuel 71 from the first fluid injection port 145, radially between the centerbody 110 and the outer sleeve 120, is introduced to the premix passage 102 between a first stream of air 106 from the first air inlet port 122 and a second stream of air 108 from the second air inlet port 124, the fuel and air mix away from fluid boundary layers along the centerbody surface 111 and the outer sleeve surface 119 along the premix passage 102. The axial orientation of the first fluid injection port 145 releases fuel into the premix passage 102 approximately co-linearly to the direction of the air 106, 108 moving to the downstream end 98 of the premix passage 102 of the fuel injector 100, while preventing fuel contact or build-up on either the centerbody surface 111 or the outer sleeve surface 119. Preventing fuel contact or build-up on either surface 111, 119 mitigates fuel coking within the premix passage 102.

In another embodiment of the fuel nozzle 200 shown in FIG. 8, the first fluid injection port 145 may be axially oriented and disposed radially inward of the second air inlet port 124. The first fluid injection port 145 may define an oblique angle relative to a longitudinal fuel injector centerline 90 of each fuel injector 100 (i.e. not co-linear or parallel to the longitudinal fuel injector centerline 90, nor perpendicular to the longitudinal fuel injector centerline 90). More specifically, the first fluid injection port 145 may be disposed at an acute angle relative to the longitudinal fuel injector centerline 90 such that there is a radial component to the injection of the fluid from the first injection port 145 into the premix passage 102.

Referring still to FIG. 8, the exemplary embodiment of the fuel nozzle 200 may further include a shroud 116 disposed at the downstream end 98 of the centerbody 110. The shroud 116 may extend axially from the downstream end 98 of the outer wall 112 of the centerbody 110 toward the combustion chamber 62. The downstream end 98 of the shroud 116 may be approximately in axial alignment with the downstream end 98 of the outer sleeve 120. The shroud 116 is annular around the downstream end 98 of the outer wall 112. The shroud 116 may further define a shroud wall 117 radially extended inward of the outer wall 112. The shroud wall 117 protrudes upstream into the centerbody 110. The shroud wall 117 may define a radius that protrudes upstream into the centerbody 110. The upstream end 99 of the shroud wall 117 may be in thermal communication with the fluid conduit 142. The shroud 116 may provide flame stabilization for the no- or low-swirl flame emitting from the fuel injector 100.

The centerbody surface 111 of the fuel injector 100 may extend radially toward the outer sleeve surface 119 to define a lesser cross-sectional area at the outlet 104 than upstream of the outlet 104 of the premix passage 102. In the embodiment shown in FIG. 8, the premix passage 102 defines a cross-sectional area at the outlet 104 less than a cross-sectional area upstream of the outlet 104. As shown in FIG. 8, the centerbody surface 111 at the shroud 116 extends radially toward the outer sleeve surface 119 to define a lesser cross-sectional area at the outlet 104 than upstream of the outlet 104 and the shroud 116. In another embodiment, at least a portion of the outer sleeve surface 119 may extend radially outward away from the longitudinal fuel injector centerline 90. The centerbody surface 111 and the outer sleeve surface 119 defining a decreasing cross-sectional area in the premix passage 102 downstream until the outlet 104 may increase the velocity of the fuel-air mixture in the premix passage 102, thereby increasing the efficiency of the mixture and resulting flame.

Referring now to FIGS. 7 and 8, the forward body 230 defines a fluid chamber 132. The fluid chamber 132 is in fluid communication with the fluid conduit 142 of the centerbody 110. In the embodiment shown in FIGS. 7 and 8, the fluid chamber 132 may flow the fuel 71 through at least a portion of the plurality of fuel injectors 100. The forward body 230 may further include a fluid chamber inlet to flow the fuel 71 into the fluid chamber 132. The fluid chamber inlet and the fluid chamber 132 may be connected to a tube, manifold, pipe, or other walled structure to flow the fuel 71 from a fuel source. Additionally, the fluid chamber 132 may be connected to an air or inert gas source to flow air or inert gas. For example, air or inert gas may flow through the fluid chamber 132 through the fuel injectors 100 to purge or cool the fuel injectors 100, the forward body 230, or fuel nozzle 200.

In various embodiments, the fuel nozzle 200 may include a plurality of fluid chambers 132 fluidly segregated from one another within each fuel nozzle 200. The plurality of fluid chambers 132 may receive and/or flow fuel 71 through a respective plurality of fuel injectors 100. Each plurality of fluid chambers 132 may be receive and/or flow the fuel 71 independently. For example, the plurality of fluid chambers 132 may flow the fuel 71 at independent or different flow rates, pressures, or temperatures relative to one another.

Although FIGS. 1-9 show the embodiments of the fuel nozzle 200 with four fuel injectors 100, in other embodiments the fuel nozzle 200 includes fewer or additional fuel injectors 100. In other embodiments, the fuel nozzle 200 may include five, or eight, or twelve, or thirteen, etc. fuel injectors 100 per fuel nozzle 200. In still other embodiments, a plurality of sleeves 210 may be included between the plurality of fuel injectors 100. For example, the fuel nozzle 200 may include one sleeve 210 per two fuel injectors, or one sleeve 210 per three fuel injectors, or one sleeve 210 per four fuel injectors. In still other embodiments, the fuel nozzle 200 may include one fluid chamber 132 per fuel injector 100, or one fluid chamber 132 per two fuel injectors 100, or one fluid chamber 132 per four fuel injectors 100, etc.

Referring now to FIG. 9, a cross sectional view from plane 9-9 in FIG. 8 is shown of an exemplary embodiment of the fuel nozzle 200. FIG. 8 further shows an air supply cavity 190 disposed between the plurality of fuel injectors 100 and surrounding the sleeve 210. The aft body 220, the plurality of fuel injectors 100, and the forward body 230 together define the air supply cavity 190. The air supply cavity 190 feeds compressed air 82 to the plurality of fuel injectors 100 and the sleeve 210. The aft body 230 defines a barrier to fluidly separate the air supply cavity 190 and the diffuser cavity 84 upstream 99 of the aft body 230 from the combustion chamber 62 downstream 98 of the aft body 230.

As shown in FIG. 9, the sleeve 210 includes a radial swirler 217 defined by the plurality of air inlet port walls 216 in the sleeve 210. The plurality of air inlet port walls 216 are defined at an angle 218 relative to a vertical reference line 89 along radial direction R such as to impart a swirl to the air 82 entering the air passage 209 or mixing passage 208 (as shown in FIGS. 3-7).

Figure 10:
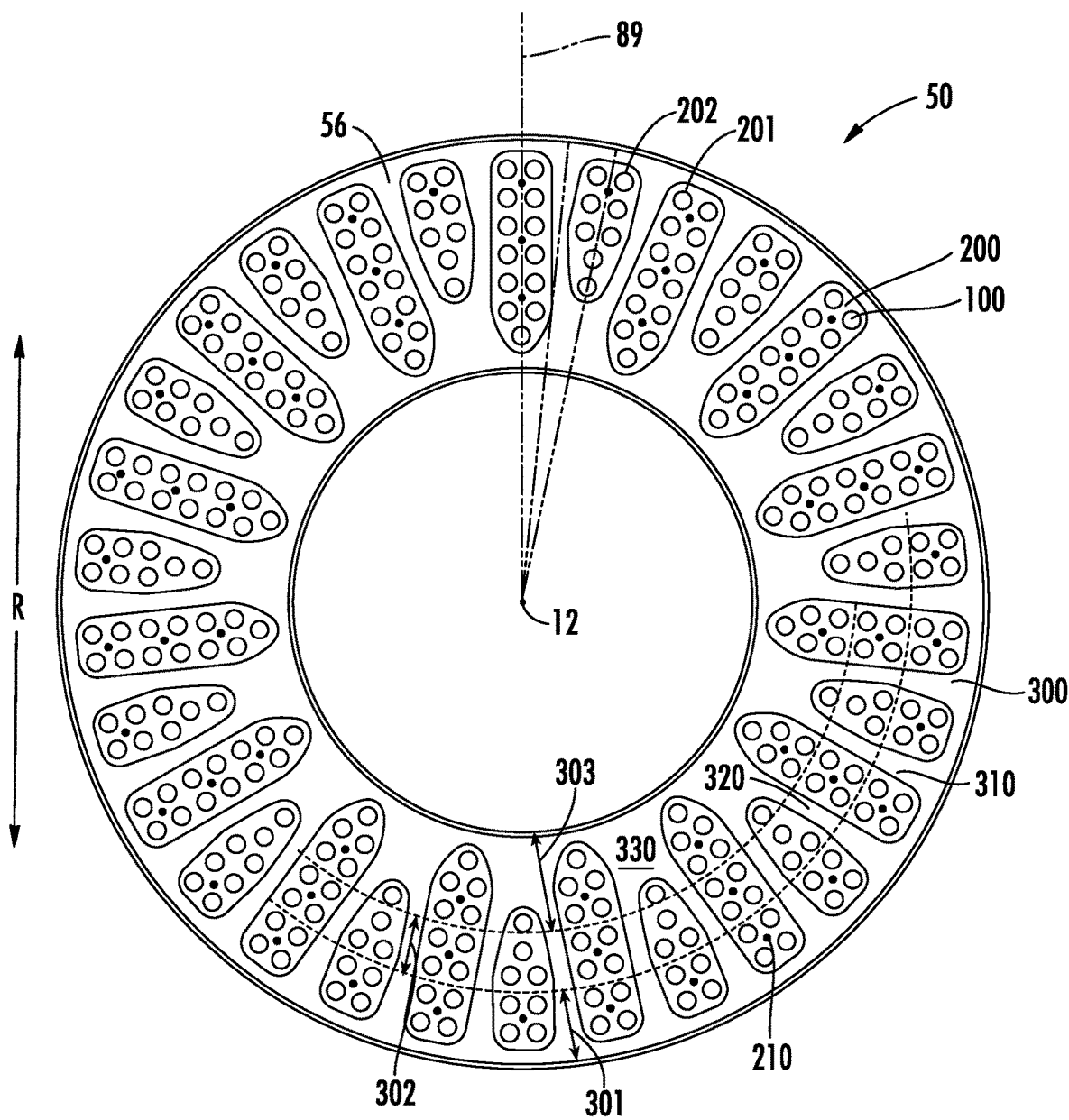
FIG. 10 is a flowpath view looking downstream of an exemplary combustor assembly including exemplary embodiments of a fuel nozzle.

Referring now to FIG. 10, an exemplary embodiment of a combustor assembly 50 is provided of from the downstream end 98 within the flowpath viewed toward the upstream end 99. The combustor assembly 50 includes a plurality of the fuel nozzle 200 shown and described in regard to FIGS. 1-9. In the embodiment shown in FIG. 9, the combustor assembly 50 is an annular configuration in which the plurality of fuel nozzles 200 is in circumferentially adjacent arrangement. In other embodiments, the combustor assembly 50 may be a can or can-annular arrangement including a plurality of fuel nozzles 200.

In the embodiment shown in FIG. 10, the combustor assembly 50 includes examples of fuel nozzles 200 including different pluralities of fuel injectors 100. In one non-limiting example, a first fuel nozzle 201 is shown including thirteen fuel injectors 100. In another non-limiting example, a second fuel nozzle 202 is shown including eight fuel injectors 100.

In various embodiments, the one or more sleeves 210 defines a separately controllable fuel-air injection to the combustion chamber 62 or a separately controllable mixing passage 208 relative to the one or more fuel injectors 100 of each fuel nozzle 200. In various embodiments, the sleeve 210 may define a pilot fuel-air nozzle (e.g. for ignition or low power stability) or provide a main fuel-air supply. In still other embodiments, the sleeve 210 defines a fuel and air flowpath independent of the one or more fuel injectors 100. For example, flow conditions (e.g. pressures, temperatures, velocities, turbulences, or mixing, etc.) for fuel 71 and/or air 82 at and through the sleeve 210 are at least substantially independent of flow conditions through the one or more fuel injectors 100.

In various embodiments, the plurality of fuel nozzles 200 may define a plurality of independent combustion zones 300. In one embodiment, the sleeve 210 mixes the fuel 71 and air 82 (shown in FIGS. 1-9) to produce a fuel-air mixture 72 to inject and combust in the combustion chamber 62. The fuel-air mixture 72 may inject into the combustion chamber 62 to provide an initial fuel-air mixture for light-off. In other embodiments, the pilot fuel-air mixture 302 may provide a fuel-air mixture to promote altitude light-off (i.e. ignition while the engine 10 is at any altitude off of the ground).

In another embodiment, the combustor assembly 50 defines at least a first combustion zone 310 and a second combustion zone 320. In still other embodiments, the combustor assembly 50 may define a third combustion zone 330. In various embodiments, the combustion zones 300 may in radial arrangement. As a non-limiting example, the first combustion zone 310 may include at least a portion of an outer circumference 301 of the combustor assembly 50. As another non-limiting example, the second combustion zone 320 may include at least a portion of a middle circumference 302 of the combustor assembly 50. In yet another non-limiting example, the third combustion zone 330 may include at least a portion of an inner circumference 303 of the combustor assembly 50.

Figure 11:
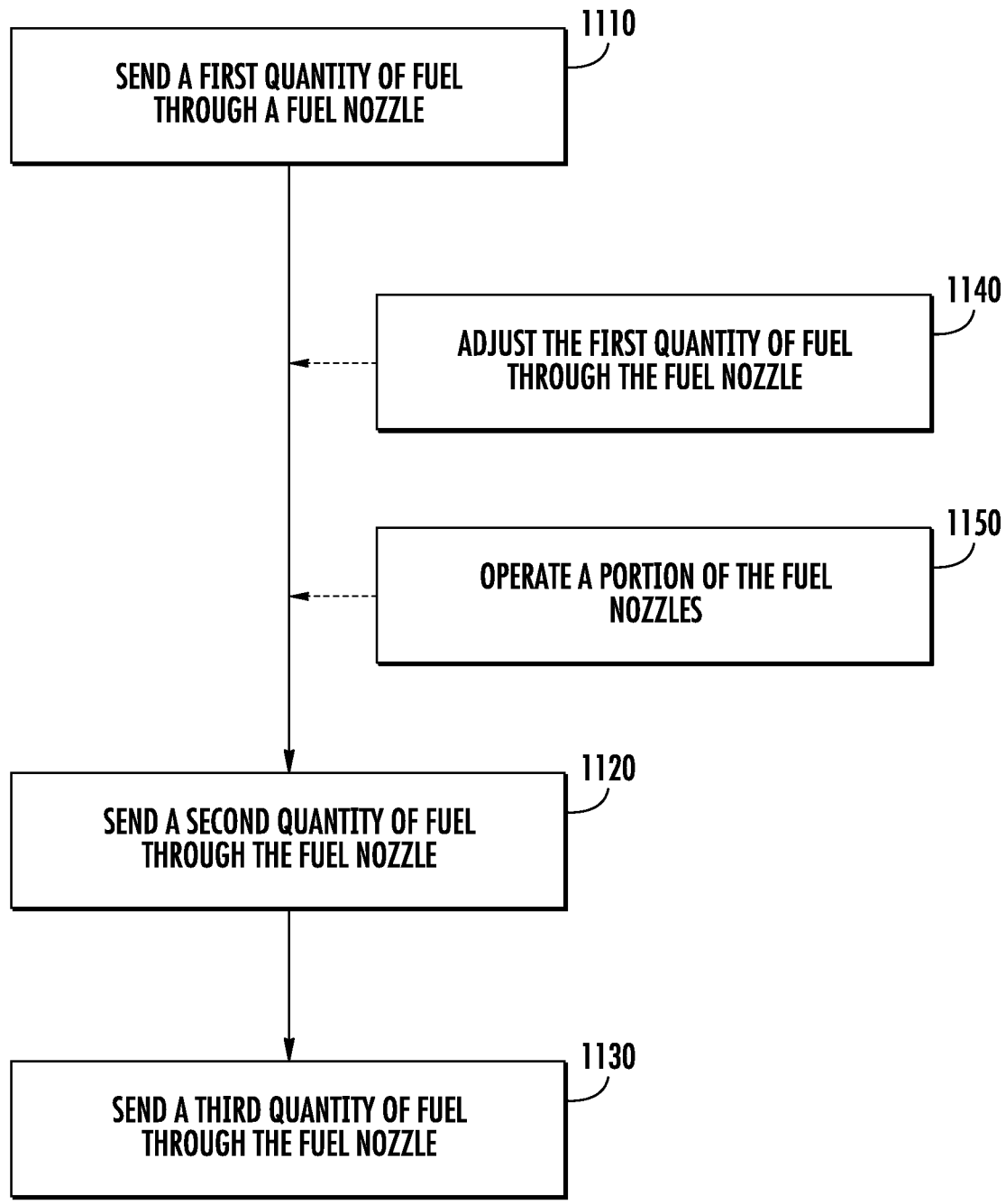
FIG. 11 is a flowchart of a method of operating a gas turbine engine.

Referring now to FIG. 11, a flowchart of an exemplary embodiment of a method of operating a gas turbine engine is provided 1100 (herein referred to as "method 1100"). The method 1100 may provide improved combustion stability, ignition capability, and emissions. Additionally, the method 1100 may improve turndown capability. For example, the method 1100 may improve emissions and/or combustion stability at part-power conditions. The method 1100 may be implemented with the fuel nozzle 200 and combustor assembly 50 as shown and described in regard to FIGS. 1-10. FIG. 11 depicts steps performed in a particular order for the purposes of illustration and discussion. Those of ordinary skill in the art, using the disclosures provided herein, will understand that various steps of any of the methods disclosed herein can be adapted, modified, rearranged, omitted, or expanded in various ways without deviating from the scope of the present disclosure.

The method 1100 at (1110) includes sending a first quantity of fuel through a fuel nozzle. For example, the first quantity of fuel can flow through the sleeve 210 of each of the plurality of fuel nozzles 200 of the combustor assembly 50. The first quantity of fuel may flow through the fuel nozzle 200 to begin an initial light-off or combustion in the combustion chamber 62. Sending a first quantity of fuel through a fuel nozzle may further include sending a first compressed air through the fuel nozzle. The first compressed air may correspond to a first range of rotational speed of the engine. For example, the gas turbine engine may define, in increasing power output, a light-off or ground idle speed (GIDLE), a part-load or flight idle speed (FIDLE), and a full load or maximum takeoff condition (MTO). FIDLE may include any power output less than MTO and greater than the lowest power output following light-off (GIDLE). The first quantity of fuel and the first range of rotational speed may range from approximately zero to approximately GIDLE. Referring to the combustor assembly 50 shown and described in regard to FIG. 19, in one embodiment, the first quantity of fuel may mix with compressed air and inject to the combustion chamber 62 from the sleeve 210. In another embodiment, the first quantity of fuel may mix with compressed air and inject to the combustion chamber 62 from the first combustion zone 310.

The method 1100 at (1120) includes sending a second quantity of fuel through the fuel nozzle. For example, the second quantity of fuel can flow through the second combustion zone 320 of each of the plurality of fuel nozzles 200 of the combustor assembly 50 described in regard to FIG. 10. Sending a second quantity of fuel through the fuel nozzle may further include sending a second compressed air through the fuel nozzle. The second compressed air may correspond to a second range of rotational speed of the engine. The second range of rotational speed may be defined from approximately GIDLE to FIDLE. The second quantity of fuel may flow through the fuel nozzle 200 to increase a power output of the engine 10 from GIDLE to FIDLE.

The method 1100 at (1130) includes sending a third quantity of fuel through the fuel nozzle. For example, the third quantity of fuel can flow through the third combustion zone 330 of each of the plurality of fuel nozzles 200 of the combustor assembly 50 described in regard to FIG. 10. Sending a third quantity of fuel through the fuel nozzle may further include sending a third compressed air through the fuel nozzle. The third compressed air may correspond to a third range of rotational speed of the engine. The third range of rotational speed may be defined from approximately FIDLE to MTO. The third quantity of fuel may flow through the fuel nozzle 200 to increase the power output of the engine 10 from FIDLE to MTO.

In various embodiments, the method 1100 may include operating the gas turbine engine from full load or MTO to a part load or FIDLE condition while minimizing emissions and/or maintaining combustion stability. The method 1100 may include at (1140) adjusting a first quantity of fuel through the fuel nozzle. For example, the first quantity of fuel can flow through the sleeve 210 of each of the plurality of fuel nozzles 200 to control emissions, maintain combustion stability, and/or prevent lean blow out (LBO).

In still other embodiments, the method 1100 may include at (1150) operating a portion of the fuel nozzles. For example, operating a portion of the fuel nozzles 200 of the combustor assembly 50 may include operating a portion of the outer circumference 301 corresponding to at least a portion of the first combustion zone 310, the middle circumference 302 corresponding to at least a portion of the second combustion zone 320, and/or the inner circumference 303 corresponding to at least a portion of the third combustion zone 330, or combinations thereof.

The fuel injector 100, fuel nozzle 200, and combustor assembly 50 shown in FIGS. 1-10 and described herein may be constructed as an assembly of various components that are mechanically joined or as a single, unitary component and manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or mechanical fasteners, or any combination thereof, may be utilized to construct the fuel injector 100, the fuel nozzle 200, or the combustor assembly 50. Furthermore, the fuel injector 100 and the fuel nozzle 200 may be constructed of any suitable material for turbine engine combustor sections, including but not limited to, nickel- and cobalt-based alloys. Still further, flowpath surfaces may include surface finishing or other manufacturing methods to reduce drag or otherwise promote fluid flow, such as, but not limited to, tumble finishing, barreling, rifling, polishing, or coating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for a gas turbine engine, the fuel nozzle defining a radial direction, a longitudinal direction, an upstream end, and a downstream end, the fuel nozzle comprising:
   a sleeve defining a plurality of radially oriented air inlet ports, a single sleeve outlet at the downstream end of the fuel nozzle, and an annular inner wall extending radially inward from the sleeve in the radial direction and extending in the longitudinal direction,
   wherein the sleeve outlet comprises a first diameter, the inner wall defines a fluid passage therewithin, and an inner wall outlet is disposed at a downstream end of the inner wall,
   wherein a first radially oriented air inlet port of the plurality of radially oriented air inlet ports is disposed upstream of the inner wall outlet and a second radially oriented air inlet port of the plurality of radially oriented air inlet ports is disposed downstream of the inner wall outlet,
   wherein a radial swirler of the plurality of radially oriented air inlet ports is disposed downstream of the first radially oriented air inlet port and the second radially oriented air inlet port,
   wherein the first radially oriented air inlet port, the second radially oriented air inlet port, and the radial swirler are in serial arrangement through the sleeve along the longitudinal direction,
   and further wherein the first radially oriented air inlet port and the second radially oriented air inlet port define a radially inward, straight flow perpendicular to a centerline axis of the fuel nozzle; and
   a plurality of fuel injectors surrounding the sleeve, each of the plurality of fuel injectors comprising a single annular fuel injector outlet having an inner circumference defining a second diameter, the second diameters being greater than the first diameter of the sleeve outlet,
   wherein the sleeve and each of the fuel injectors are connected to an aft body at the downstream end of the fuel nozzle and a forward body at the upstream end of the fuel nozzle, such that the annular fuel injector outlets and the sleeve outlet are at the same location along the longitudinal direction.

2. The fuel nozzle of claim 1, wherein the sleeve further comprises a plurality of air inlet port walls defining the radial swirler.

3. The fuel nozzle of claim 2, wherein the inner wall and the sleeve define an air passage therebetween.

4. The fuel nozzle of claim 1, wherein the sleeve defines a mixing passage extended from the inner wall outlet to the sleeve outlet.

5. The fuel nozzle of claim 1, wherein the sleeve further defines a sleeve inlet, and wherein the sleeve inlet flows a fuel through the fluid passage.

6. The fuel nozzle of claim 1, wherein the aft body, the plurality of fuel injectors, and the forward body together define an air supply cavity to feed air to the plurality of fuel injectors and the sleeve.

7. The fuel nozzle of claim 1, wherein the sleeve is a unitary structure with the forward body and the aft body.

8. The fuel nozzle of claim 1, wherein the sleeve defines the fluid passage upstream of the inner wall.

9. The fuel nozzle of claim 1, wherein at least a portion of the inner wall is an inner diameter portion of the sleeve upstream of the first air inlet port.

10. The fuel nozzle of claim 1, wherein the fuel nozzle is configured to flow only a liquid and/or gaseous fuel through the fluid passage, and wherein the fuel nozzle is configured to flow air through the first air inlet port, the second air inlet port, and the radial swirler to mix with the flow of fuel at a mixing passage downstream of the inner wall outlet.

11. A combustor assembly for a gas turbine engine, the combustor assembly defining a radial direction, a longitudinal direction, an upstream end, and a downstream end, the combustor assembly comprising:
   a bulkhead wall extended radially between an upstream end of an inner liner and an upstream end of an outer liner, wherein the inner liner is radially spaced from the outer liner with respect to an engine centerline to define an annular combustion chamber therebetween, and wherein the inner liner and the outer liner extend downstream from the bulkhead wall;

and one or more fuel nozzles extended at least partially through the bulkhead wall, each of the fuel nozzles comprising:

a sleeve defining a plurality of radially oriented air inlet ports, a single sleeve outlet at the downstream end of the fuel nozzle, and an annular inner wall extending inward from the sleeve in the radial direction and extending in the longitudinal direction, wherein the sleeve outlet comprises a first diameter, the inner wall defines a fluid passage therewithin, and an inner wall outlet disposed at a downstream end of the inner wall, wherein a first radially oriented air inlet port of the plurality of radially oriented air inlet ports is upstream of the inner wall outlet and a second radially oriented air inlet port of the plurality of radially oriented air inlet ports is disposed downstream of the inner wall outlet, wherein a radial swirler of the plurality of radially oriented air inlet ports is disposed downstream of the first radially oriented air inlet port and the second radially oriented air inlet port, wherein the first radially oriented air inlet port, the second radially oriented air inlet port, and the radial swirler are in serial arrangement through the sleeve along the longitudinal direction, and further wherein the first radially oriented air inlet port and the second radially oriented air inlet port define a radially inward, straight flow perpendicular to a centerline axis of the fuel nozzle;

and a plurality of fuel injectors surrounding the sleeve, each of the plurality of fuel injectors comprising a single annular outlet having an inner circumference defining a second diameter, the second diameters being greater than the first diameter of the sleeve outlet, wherein the sleeve and each of the fuel injectors are connected to an aft body at a downstream end of the fuel nozzle and a forward body at an upstream end of the fuel nozzle, such that the annular fuel injector outlets and the sleeve outlet are at the same location along the longitudinal direction.

12. The combustor assembly of claim 11, wherein the combustor assembly defines a first combustion zone and a second combustion zone, and wherein the first combustion zone is defined in at least a portion of an outer circumference of the annular combustion chamber, and wherein the second combustion zone is defined in at least a portion of a middle circumference of the annular combustion chamber.

13. The combustor assembly of claim 12, wherein the combustor assembly further defines a third combustion zone defined in at least a portion of an inner circumference of the annular combustion chamber.

\* \* \* \* \*